(12) United States Patent
Calamera et al.

(10) Patent No.: US 6,463,533 B1
(45) Date of Patent: Oct. 8, 2002

(54) SYSTEM FOR GENERATING SITE-SPECIFIC USER ALIASES IN A COMPUTER NETWORK

(75) Inventors: Pablo M. Calamera; Jay D. Logue, both of San Jose; Joseph D. Ternasky, Palo Alto, all of CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/293,634

(22) Filed: Apr. 15, 1999

(51) Int. Cl.[7] .................................................. G06F 1/24
(52) U.S. Cl. ........................ 713/163; 713/200; 713/201
(58) Field of Search ................................ 713/163, 200, 713/201

(56) References Cited

U.S. PATENT DOCUMENTS 5,825,772 A * 10/1998 Dobbins et al. ............. 370/396
5,835,758 A * 11/1998 Nochur et al. ............... 707/102
5,842,018 A * 11/1998 Atkinson et al. .......... 707/501.1

* cited by examiner

Primary Examiner—Thomas R. Peeso
(74) Attorney, Agent, or Firm—Workman, Nydegger & Seeley (57) ABSTRACT

An system for allowing a computer network site to recognize an anonymous user without revealing the identity of the user. The system involves generating a user alias based on the user's identity and the computer network site such that it is computationally difficult to determine the user's identity from the alias alone. The system further involves informing the computer network site of the alias upon access of the site by the user. The computer network site may then block access to the site's contents whenever it receives an alias associated with a disruptive user.

61 Claims, 8 Drawing Sheets

SYSTEM FOR GENERATING SITE-SPECIFIC USER ALIASES IN A COMPUTER NETWORK

FIELD OF THE INVENTION

The present invention relates to identifying users in a network environment. More particularly, the invention relates to providing individual, site-specific aliases for anonymous users accessing Internet websites.

BACKGROUND OF THE INVENTION

Electronic exchange of data, such as occurs over the Internet or other online services, is becoming an increasingly important and common medium for the delivery of information, conducting commerce and general interpersonal communication. By way of example, users can purchase a wide array of products over the Internet, engage in discussions on almost any subject in various "chat" groups and find information on a practically unlimited range of topics. Similarly, content providers who operate the various websites available to users over the Internet, such as businesses, trade groups and others, are able to reach existing and potential customers or interested parties with product and service information, or simply promote a subject or hobby in which they are interested.

With the increasingly widespread use of electronic communications in society, it is perhaps not surprising that some individuals and entities make improper use of this medium. In some cases the improper use may involve fraud or other criminal behavior. In other cases, the improper use may simply be disruptive messages at a chat site. Whatever the nature of the improper use, it is necessary that such users be identifiable to legal authorities in criminal cases or to the site operator in the case of obnoxious behavior. Identification of the offending user allows a site-operator to block subsequent access by the user or may be the initial phase of criminal prosecution. Unfortunately, identification of an offending Internet user is not always an easy task.

The standard Internet identification system is the Internet Protocol address (IP address). An IP address is a unique identifier assigned to each direct link to the Internet. When a user with a direct link requests content contained at a site, the site must know the user's IP address to send the requested content to the user who requested it. Thus, an offending user with a direct link to the Internet can be identified through his or her IP address. A site-operator can deny a specific user access to his or her site by refusing to send content to the user's IP address. However, most users do not have a direct link to the Internet. Instead, most users connect to the Internet through a third party.

There are currently many entities providing access to the Internet through their direct links. One example is known as an "On-Line Service" (OLS). In addition to providing access to the internet, an OLS will usually also offer unique content and services to its "subscribers" that is not otherwise available on the Internet (or is only available to a user for an additional fee). A more common example is known as an "Internet Service Provider" (ISP). An ISP only provides its subscribers with access to the Internet (and perhaps related services such as e-mail, and personal websites). An ISP typically does not provide additional content beyond what is available over the Internet.

Another entity providing access to the Internet is the WEBTV® Internet access network, (WEBTV is a registered trademark of WebTV Networks, Inc. of Mountain View, Calif.) Unlike most OLS's and ISP's which require a user to own a personal computer, the WEBTV system allows its subscribers to access the Internet using an ordinary television. WebTV Networks, Inc. provides the additional hardware and software necessary for the user to connect to the Internet and display websites on his or her television. WEBTV subscribers gain access to the Internet through a WEBTV Internet Server which has a plurality of direct links to the Internet. The WEBTV Internet Server also offers supplemental services, such as email, news reports, television program guides and enhanced access to certain websites.

Regardless of which type of Internet access provider is involved, when a user/subscriber is connected to the Internet through a third party, the user does not have a unique IP address. Instead, the Internet access provider assigns to the user one of the provider's IP addresses which is not currently assigned to another subscriber. The assigned IP address identifies the user for the duration of the user's Internet session. Once the user terminates the connection to the Internet, the previously assigned IP address is available for assignment to another of the Internet access provider's subscribers. When the user subsequently connects to the Internet through the Internet access provider, the user will be assigned another IP address which usually will be different than the previous assigned IP address.

Thus, users who access the Internet through a third party do not have the same IP address each time they connect to the Internet. Consequently, the IP address only identifies the third party, not the individual users. While the third party might keep records of which subscriber used an IP address at a specific time to access a specific website, searching those records would be a laborious process. Furthermore, a website could not block one subscriber without blocking all subscribers of a particular third party.

In addition to IP addresses, another way that a site-operator can identify a user is through the use of an Internet "cookie." A cookie is a piece of data which a site instructs the user's Internet terminal to store in memory and then send back to the site each time the user accesses the site. If the site uses a different cookie value for each user, the site can recognize repeating users and refuse to communicate with users who are disruptive.

The limitation of the cookie method is that the site cannot determine the actual identity of the user unless the user volunteers the information. As a result, law enforcement agencies cannot identify users if the only information available is the user's cookie value. In addition, most user terminals allow users to access the cookies stored on their user terminals and to either change or delete the cookies. Thus, a user who is blocked from accessing a site can defeat the blocking by deleting or changing his or her cookies.

In addition to the problems that users can create, site operators may perpetrate abuses as well. For instance, some site operators may infringe on users' right to privacy by attempting to collect personal information about users. Other sites may compile lists of users who access the site to direct unsolicited advertising email to those users. In addition, two or more site-operators may try to correlate their cookie databases to find users who visit multiple sites. If successful, the site-operators can then track the user's Internet "browsing" across several sites. By matching users through cookie values and sharing information gained about the users, site-operators might be able to determine the actual identity of users and target those users for direct-mail, etc.

Thus, it would be desirable to have a system which allows site-operators to recognize and block unwanted users while maintaining the anonymity of users. In addition, it would be desirable to have a system which allows law enforcement agencies to determine the identity of an anonymous user.

SUMMARY OF THE INVENTION

The present invention includes a system for allowing a computer network site, such as an Internet website, to recognize an anonymous user without revealing the identity of the user. The system involves generating a user alias based on the user's identity and the computer network site such that it is computationally difficult to determine the user's identity from the alias alone. Once the alias is generated, the computer network site is informed of the alias upon access of the site by the user. The computer network site may then block access to the site's contents whenever it receives an alias associated with a disruptive user.

DETAILED DESCRIPTION OF THE INVENTION

Figure 1:
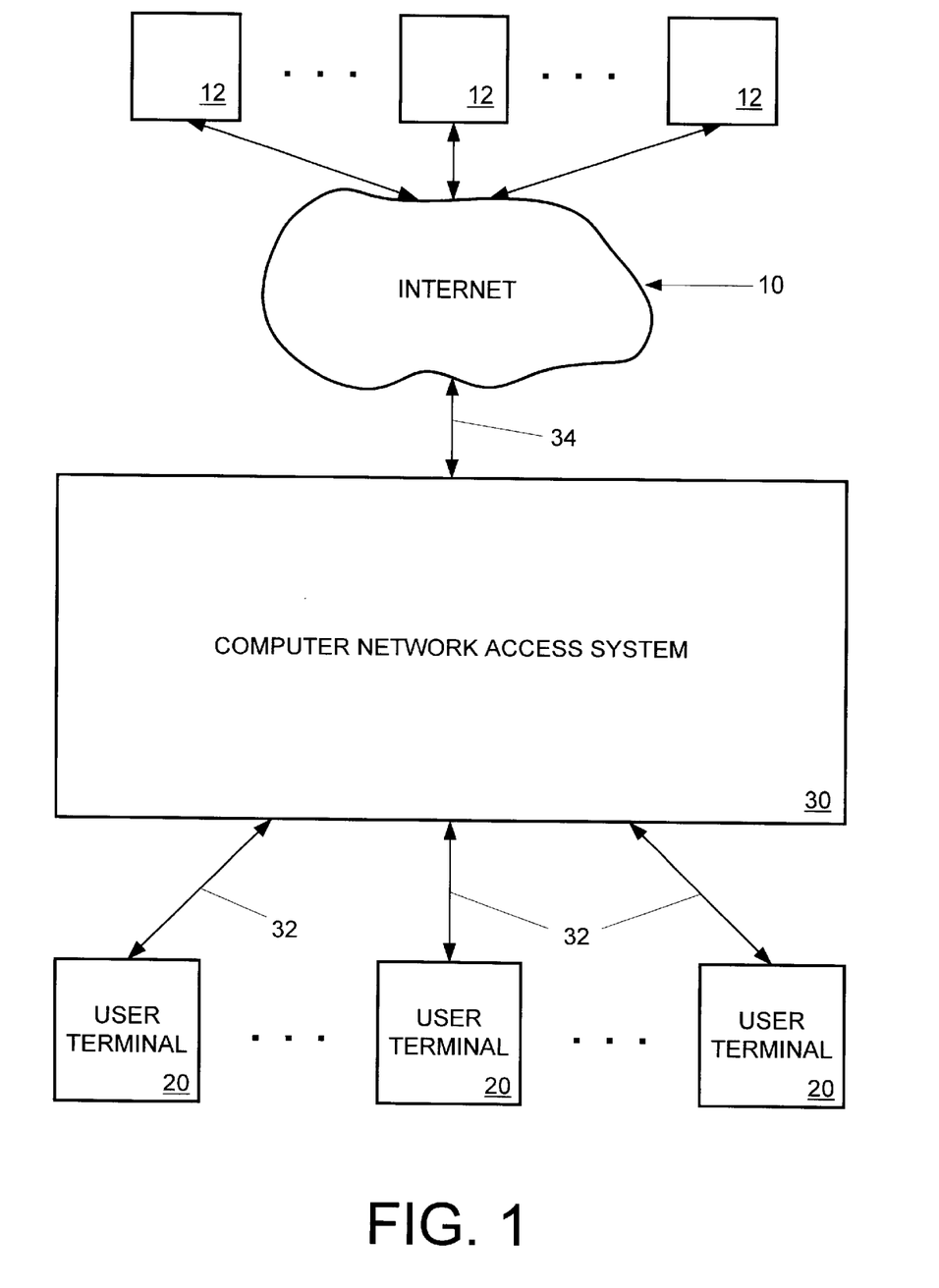
FIG. 1 is a schematic view of a system for providing a plurality of users with access to Internet websites.

A system for providing a plurality of users with access to a plurality of computer network sites is shown generally at 30 in FIG. 1. System 30 is connected to a plurality of computer network sites 12 via a computer network 10 (e.g., the Internet). System 30 is also connected to at least one user terminal 20. Terminal 20 is configured to receive content available at computer network sites 12, such as data files, graphics, etc. System 30 typically is connected to the computer network via a high-speed, high-capacity communications line 34 such as a T1 or fiber optic cable. System 30 thus operates as an access point for, and communications link between, user terminal 20 and computer network sites 12. Although communications line 32 is typically a plain old telephone service (POTS) line, other well known alternatives, such as Integrated Services Digital Network (ISDN) connections, are also suitable.

Figure 2:
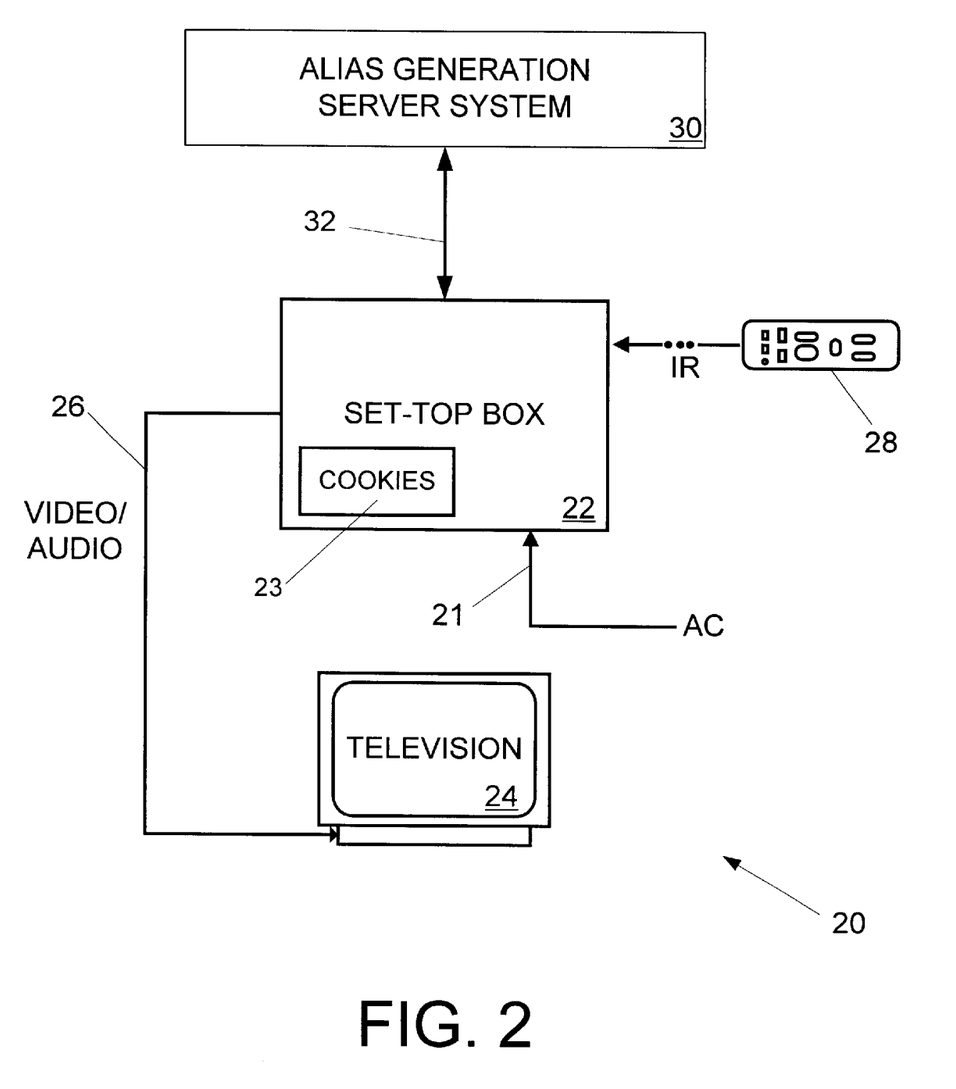
FIG. 2 is a schematic view of a user terminal configured for use as part of the present invention.

User terminal 20 may take the form of a WEBTV Internet terminal. As shown in FIG. 2, terminal 20 includes an electronics unit 22 (hereinafter referred to as "set-top box" 22 because it is often positioned on the top of a television set), television set 24, and a remote control 28. Alternatively, set-top box 22 may be built into television set 24 as an integral unit.

The user terminal employs television set 24 as a display device for displaying video data, audio data, and a graphical user interface. The set-top box is coupled to the television set by a video and audio link 26. Link 26 is an RF (radio frequency), S-video, composite video, or other equivalent link. Set-top box 22 includes hardware and/or software to cause a graphical user interface to be displayed on television 24, by which the user can access various Internet system network services, browse the Web, send email, and otherwise access the Internet. Set-top box 22 may also include a memory storage device 23, for storing data. Memory storage device 23 will be discussed in more detail below.

User terminal 20 may include a standard modem and/or an ISDN modem, so that line 32, between user terminal 20 and system 30, can be either a POTS line or an ISDN line. Alternatively, user terminal 20 may include a DOCSIS modem for communicating via a cable system or an antenna transmitter for wireless communications such as via satellite. As a further alternative, user terminal 20 may receive data via one type of communications line, and send data or requests for data via a different type of communications line. Typically, both a standard modem and an ISDN modem are included in set-top box 22. The set-top box receives power through a power line 21.

Remote control 28 acts as an input device and is operated by the user to control the user terminal while browsing the Web, sending email, and performing other Internet-related functions, as well as to control television viewing. The set-top box receives commands from remote control 28 via an infrared (IR) communication link. Alternatively, the link between the remote control and the set-top box may be RF or any equivalent mode of transmission (e.g., wires, etc.), and the input device may include a keyboard, microphone, etc.

Although user terminal 20 is described above in the context of a WEBTV Internet terminal, it will be appreciated that there are a number of other suitable contexts which are within the scope of the invention. One such context is a personal computer including a monitor or other graphics display device and a modem, where the computer is configured to run an Internet navigating program such as MICROSOFT® INTERNET EXPLORER 4.0, manufactured by Microsoft, Corporation of Redmond, Wash. In such a context, the computer monitor functions like television 24 of the WEBTV Internet terminal while the computer functions like set-top box 22 when the computer is running the Internet navigating program. Additionally, the computer will include a keyboard, mouse or other input device which functions like remote control 28.

In any event, a user wishing to receive content available on computer network 10 operates user terminal 20 to create a communications connection to system 30 via line 32. System 30 is capable of independently communicating with a plurality of user terminals and acting as a communications link to transmit content available on computer network 10 to each user's terminal as requested by the user. Once the communications connection to system 30 has been established, the user may operate user terminal 20 to access the computer network site 12 (hereinafter referred to as a "website") in which the user is interested.

The user typically accesses a specific website by using remote control 28 to select the Internet address and file path of the desired content on a specific website. (The Internet address and file path are hereinafter collectively referred to as a Uniform Resource Locator (URL), which is the current protocol for designating content on the Internet.) The remote control causes set-top box 22 to communicate with system 30 to locate the specific website and "download" the desired content to the user terminal. By repeating this process, a user can move among—or "browse"—a variety of websites available on the Internet.

Figure 3:
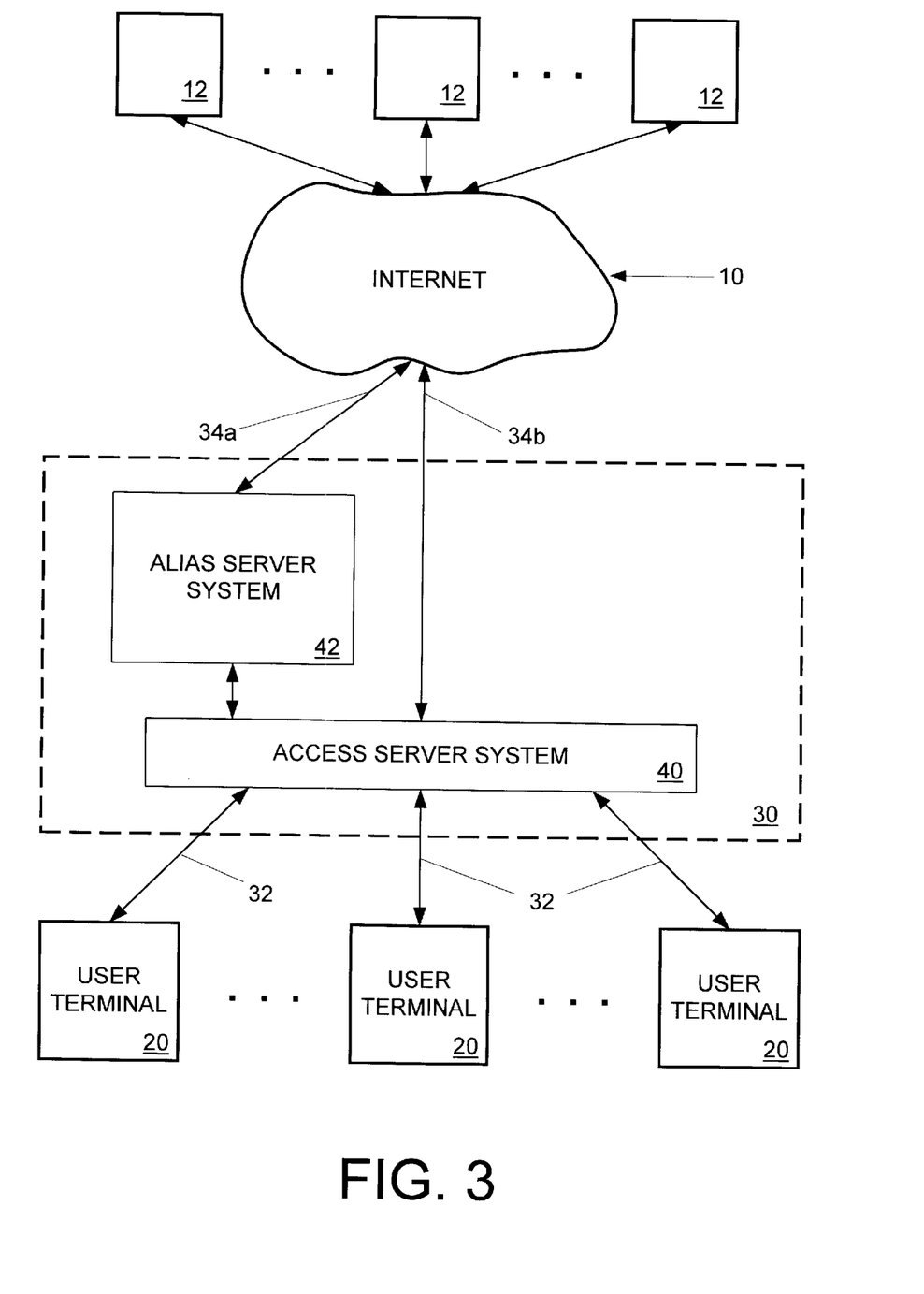
FIG. 3 is a schematic view of the architecture of the system of FIG. 1 which includes an alias server system for providing individual, site-specific aliases for the users according to the present invention.

In FIG. 3, user terminal 20 is connected to access Internet websites 12 via system 30. System 30 includes an access server system 40 connected to communicate with a plurality of user terminals and configured to provide Internet access to those user terminals. Access server system 40 provides the primary interface between the user terminals and the Internet. The access server system may be the central server of an OLS, ISP, or WEBTV, or it may be a local dial-up service for remote subscribers to communicate with their Internet access provider.

Access server system 40 includes a modem pool (not shown), such as those found today throughout the world providing access to the Internet and private computer networks. The access server system also includes a computer server (not shown), configured to provide Internet access to at least one client user terminal. User terminals 20 are connected to the modem pool of access server system 40 via direct-dial, bi-directional communications lines 32, which may be POTS lines, ISDN lines, or any other similar type of connection, such as cable and satellite forward channels.

Access server system 40 also includes one or more direct links 34b to the Internet. Associated with each direct link is a unique IP address. When access server system 40 communicates with websites 12, the content from the websites are routed to the access server system, via the Internet, to the IP address of the access server. The access server system is configured to receive a URL from a user terminal when selected by the user. The access server system then communicates with the website designated by that URL using direct link 34b and requests the website to send the desired content to the IP address of the access server system. When the access server system receives the content requested, the access server system transmits the content to the user terminal via the modem pool and lines 32.

In FIG. 3, system 30 also includes alias server system 42 which is connected to communicate with access server system 40. Alias server system 42 includes a computer server (not shown) configured to provide Internet access to client terminals or other computer servers. Like the access server system, the alias server system has its own direct link(s) 34a to the Internet along with the associated IP address(es). Alias server system 42 is configured to function as a "proxy" whereby communications between the access server system and the websites are relayed through the alias server system. In one embodiment of the invention, the alias server system also acts as a central log-in server for Internet access providers such as WEBTV to provide Internet services to subscribers in remote areas. A subscriber simply dials up an access server system in the subscriber's geographical area which connects the user's terminal to the alias server system. The alias server system authorizes the user's connection and carries out the user's requests for access to the websites.

In addition to acting as a proxy, alias server system 42 is also configured to generate a unique user alias based on the identity of the user and/or the particular user terminal which the user is operating. In one embodiment of the invention, an identification code is assigned to the user and/or the user terminal by the entity from which the user purchases Internet access. Indeed, the alias server system itself may assign an identification code to the user. In either case, no input from the user is required and the user cannot modify the identification code that is assigned. Alternatively, the identification code may be a username, a password, an email address, etc. which is selected by the user. In some situations, it may be advantageous to have the identification code assigned so that it cannot be changed by the user. This will prevent the user from changing the identification code at will, thus circumventing any attempt to block access to particular websites based on the site-specific alias generated by the present invention. The identification code should uniquely identify the user and is used by the alias server system to generate a site-specific alias for the user such that the user's identification code cannot be determined from the site-specific alias alone.

Alternatively, the identification code may identify the user terminal rather than the user. However, if the identification code identifies the user terminal, the alias generated by the alias server system will be associated with the user terminal rather than any specific user of the terminal. Thus, any use of the alias generated by the alias server system, such as blocking from a particular site, will necessarily apply to the terminal, not a particular user.

One method of generating a site-specific alias such that a user's identification code cannot be determined from the site-specific alias alone is to generate a unique, random data string corresponding to each website the user accesses. Provided the site-specific alias is truly random, it will be impossible to determine the identification code from the site-specific alias. However, since it is desirable to utilize the same site-specific alias each time the user accesses a particular website, this random code method requires that the site-specific aliases be stored in a database indexed according to user and website. Given the huge number of possible websites a user could access, this method may not always be practical since it would require an extremely large database.

One embodiment of the invention solves this problem using cryptography. (The cryptographic terms and methods used in this application are based on those found in APPLIED CRYPTOGRAPHY, BY BRUCE SCHNEIER, JOHN WILEY & SONS, SECOND EDITION, 1996, which is herein incorporated by reference.) In this embodiment of the invention, the alias server system acts as a proxy and reads the identification code of the user when the user logs into the alias server system. When the user selects a URL, the URL is transmitted to the alias server system via the access server system. Before accessing the selected website, the alias server system encrypts the user's identification code and at least a portion of the URL, thus, generating a site-specific alias based on the identification code and the Internet address of the website. While no encryption method is perfect, if the encryption method is chosen reasonably, it will be computationally intractable, or at least impractical, to decrypt the alias to determine the identification code.

There are a variety of encryption methods, well known in the art, which would be suitable for site-specific alias generation. Typically, the more complex the encryption method, the more difficult it is to break. At the same time, the more complex the encryption method, the more time-consuming it is to encrypt and decrypt. Thus, an encryption method should be chosen which balances the desired level of security with the computing resources available to the alias server system for generating aliases. In one embodiment of the invention, a one-way hash function is used to generate a site-specific user alias based on the user's identification code and the URL of the website. In an alternative embodiment of the invention, both a one-way hash function and a secret key encryption algorithm are used to generate the site-specific alias. Each of these embodiments is described in more detail below.

A one-way hash function accepts a selected message of arbitrary length, and returns a fixed-length hash value. Preferably, it will be difficult, if not impossible, to find a different message which results in the same hash value as the selected message, a result which is known. as collision. Additionally, because the hash function is "one-way," it is computationally difficult or impossible to determine the selected message from the hash value even knowing the hash function. Thus, it is impractical, if not impossible, to decrypt a hash value; once the selected message is "hashed," it cannot be restored. A hash function is often used for generating an encrypted, unique fingerprint of the selected message for verification against a purported identical message since, if the two hash values are identical, then the original messages must also have been identical.

One well known one-way hash function is Message Digest 5 (MD5). MD5 takes a message of arbitrary length and returns a 128-bit hash value. A person attempting to substitute a false message would theoretically have to hash $2^{68}$ messages to find one that has the same MD5 hash value as the authentic message.

Figure 4:
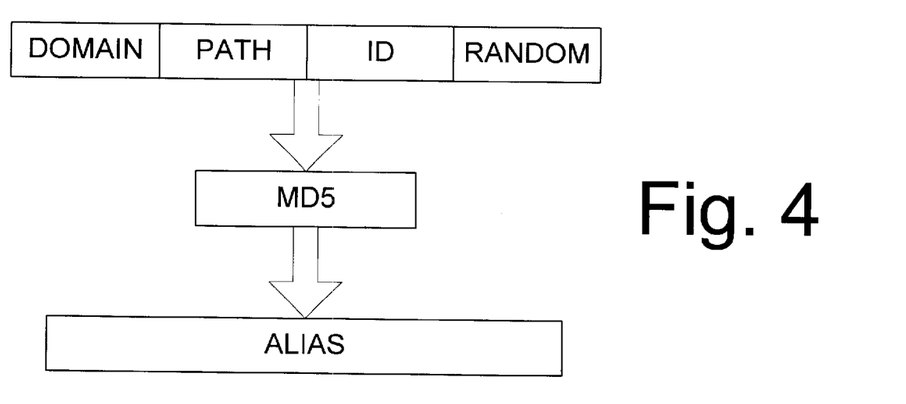
FIG. 4 is a schematic view of the one-way hash encryption algorithm according to a first embodiment of the invention.

In FIG. 4, the alias server system computes the site-specific user alias by computing the MD5 hash value of the following inputs: DOMAIN (the URL Internet domain name of the website being accessed), PATH (the URL Internet path of the website being accessed), ID (the user's identification code), and RANDOM (a random data string associated with a specific user). Within the limits of the MD5 hash function as described above, the resulting alias is unique to a specific user accessing a specific website. Further, it is computationally difficult, if not impossible, to determine the user's identification code from the alias.

The one-way hash encryption method described above can be represented in the form of mathematical formula as follows:

$$ALIAS=H(DOMAIN, PATH, ID, RANDOM)$$

Where:

H(x)=one-way MD5 hash of "x"

and:

DOMAIN=URL Internet domain name of the website being accessed

PATH=URL path of the website being accessed

ID=user identification code

RANDOM=random data string associated with the user

Unlike the secret key encryption algorithm described below, a one-way hash function is not reversible. To determine which user corresponds to a particular alias, each combination of URL, user identification code, and random data string must be processed through the one-way hash function and the result compared to the alias in question. As a result, a website which only knows the URL input to the hash function will not be able to determine the user's identification code from the alias.

The alias server system typically maintains a database (not shown) of user identification codes and corresponding random data strings so that re-computation of the hash value is possible. Thus, the alias server system is able to identify a corresponding user by processing each ID/RANDOM pair through the MD5 algorithm along with the URL of the website in question until a hash value is found which matches the alias.

Figure 5:
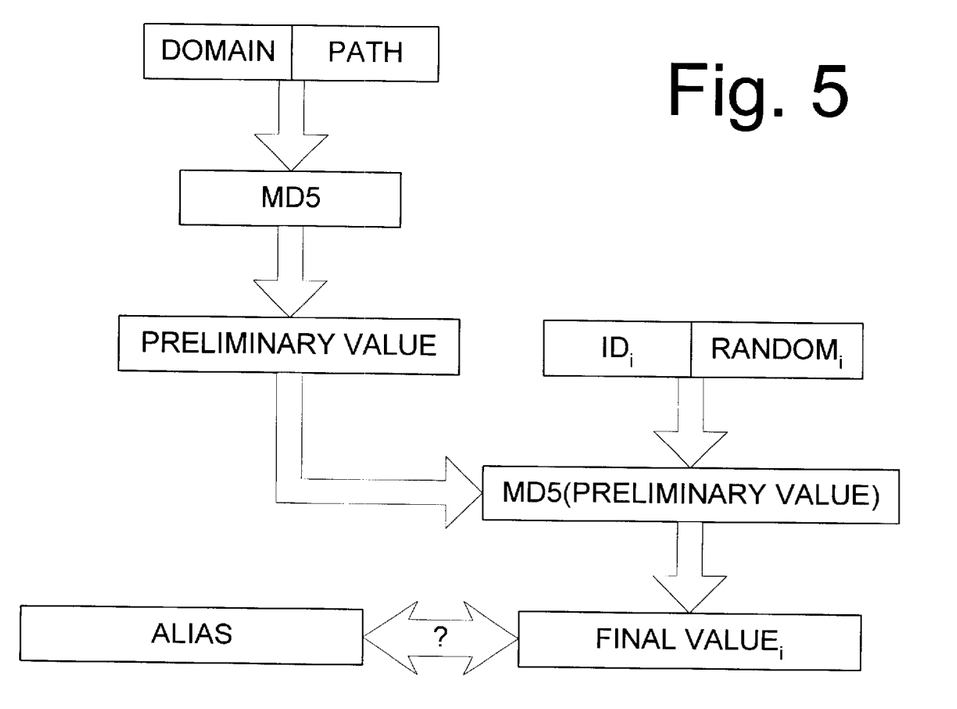
FIG. 5 is a schematic view of a simplified algorithm for determining a user's identity from a site-specific alias generated using the one-way hash encryption algorithm shown in FIG. 4.

In addition, the MD5 algorithm allows sequential processing of input values. Therefore, if the alias was originally generated with the input variables concatenated in the order described above, the alias server system can determine the user's identification code using a simplified algorithm as illustrated in FIG. 5. First, the alias server system processes the website's DOMAIN and PATH through the MD5 algorithm to obtain a preliminary value. Second, the alias server system completes the MD5 computation by processing one ID/RANDOM pair through the MD5 algorithm to obtain a final value from the preliminary value. Third the final value is compared to the alias. If the final value and alias match, the user is identified by the identification code that produced the match. Otherwise, the alias server system repeats the second step using a different ID/RANDOM pair until a match is found. It will be appreciated that since the first step need not be repeated for each attempt, this simplified algorithm saves considerable computer processing time.

A secret key encryption algorithm accepts a message and generates an encrypted version such that it is computationally difficult to determine the original message from the encrypted version alone. Unlike a one-way hash function, however, it is possible to restore the original message if the secret key(s) are known. One well known encryption algorithm is the Data Encryption Standard (DES). DES is a symmetric encryption algorithm which uses a single, secret encryption key. That is, a message can be encrypted and then decrypted using the same algorithm and secret encryption key. Because the algorithm is publicly known, the security of DES lies in choosing an appropriate encryption key and maintaining it in secrecy. DES encryption keys are 56 bits in length and are typically chosen randomly or from encrypted data. Thus, there are $2^{56}$ possible encryption keys and, for all practical purposes, the original message cannot be determined from the encrypted message. However, as is well known in the art, there are a few "weak" encryption keys which are relatively easy to break and, therefore, should be avoided.

Figure 6:
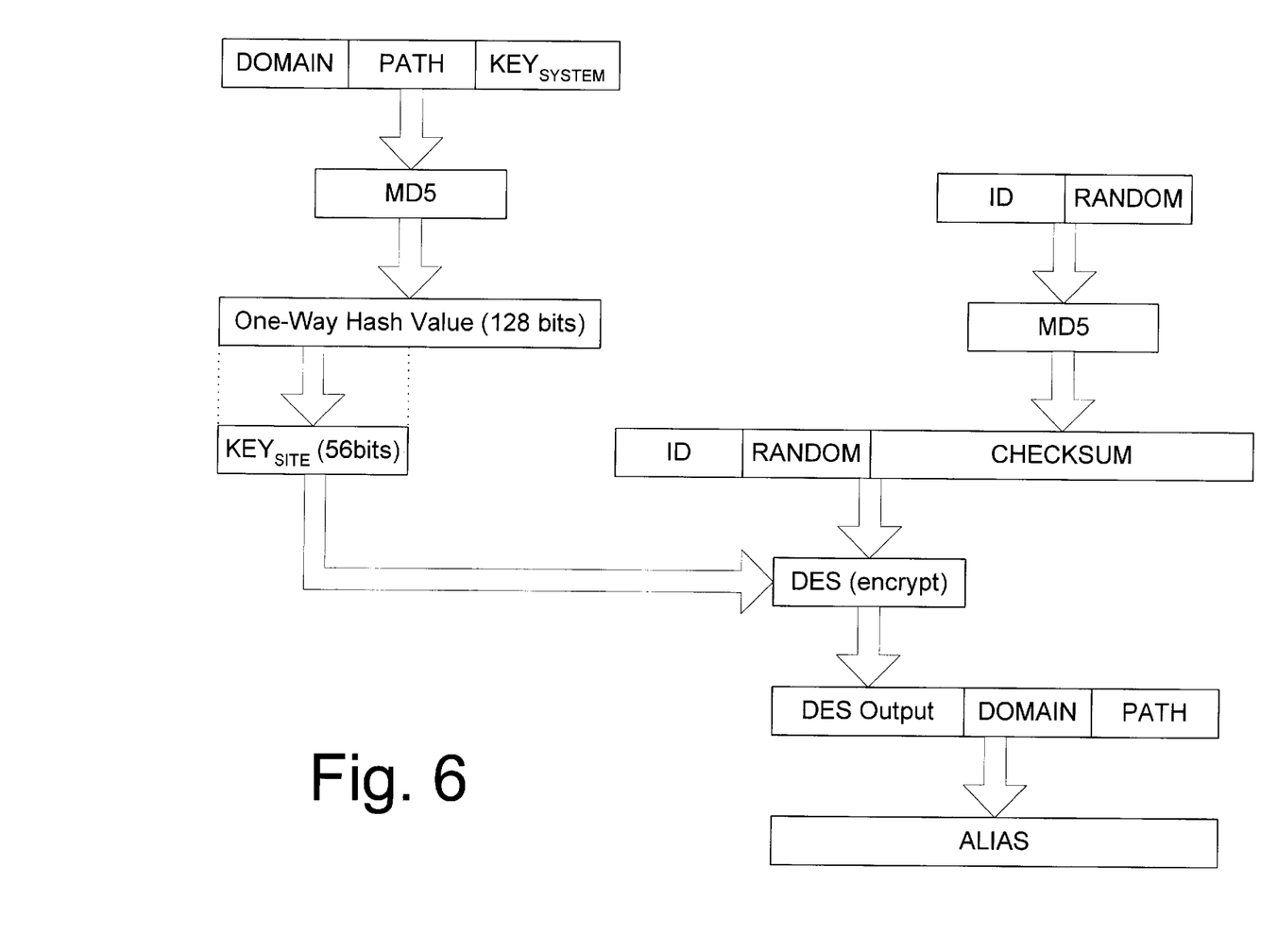
FIG. 6 is a schematic view of the secret key encryption algorithm according to an alternative embodiment of the invention.

In an alternative embodiment, depicted in FIG. 6, the alias server system generates a site-specific user alias using a three-step encryption method and the following input values: ID, $KEY_{SYSTEM}$ (a secret encryption key held by the operator of the alias server system), DOMAIN, PATH, and RANDOM. First, the alias server system computes the MD5 hash value of the combination of: DOMAIN, PATH, and $KEY_{SYSTEM}$. The first 56 bits of this hash value are referred to as $KEY_{SITE}$, which is used as the secret encryption key to generate aliases for the website being accessed. Second, the alias server computes the MD5 hash value of the combination of: ID and RANDOM. This hash value is referred to as CHECKSUM and is used to verify that a decryption is successful. Third, the alias server system uses $KEY_{SITE}$ to compute the DES encryption of the combination of: ID, RANDOM, and CHECKSUM. The alias server system appends DOMAIN and PATH to the result of the DES encryption to form ALIAS (a site-specific user alias).

The secret key encryption method described above can be represented in the form of mathematical formula as follows:

$$KEY_{SITE}=\text{first 56 bits of: } H(DOMAIN, PATH, KEY_{SYSTEM})$$

$$CHECKSUM=H(ID, RANDOM)$$

$$ALIAS=E[KEY_{SITE}](ID, RANDOM, CHECKSUM), DOMAIN, PATH$$

Where:

H(x)=one-way MD5 hash of "x"

E[k](m)=DES encryption of "m" using secret key "k"

and:

ID=user identification code $KEY_{SYSTEM}$=secret encryption key held by the operator of the alias server system DOMAIN=URL internet domain name of the web site being accessed PATH=URL path of the web site being accessed RANDOM=random data string associated with the user Note that $KEY_{SITE}$, the encryption key used to generate the site-specific alias, is an encryption of a secret key with the URL of the website. Consequently, each site-specific alias is encrypted using a different key. In addition, portions of the website's URL are appended to the encrypted value. Since each website has a unique URL, the same ALIAS cannot be generated from two different websites.

Figure 7:
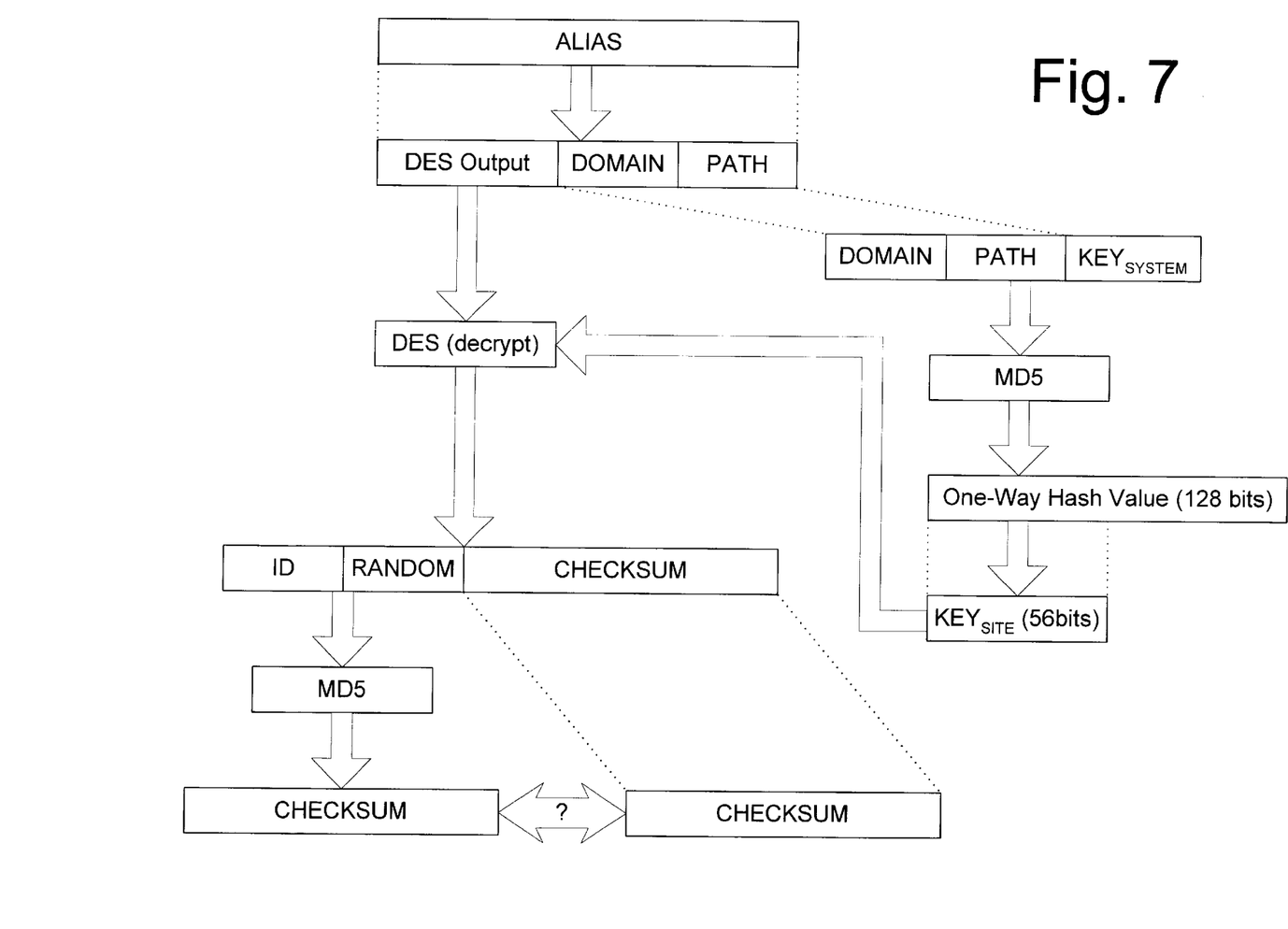
FIG. 7 is a schematic view of the secret key decryption algorithm corresponding to the encryption algorithm of FIG. 6.

As illustrated schematically in FIG. 7, to determine a user identification code from the site-specific alias, the alias server system first removes the appended values DOMAIN and PATH from ALIAS. Then the alias server system computes $KEY_{SITE}$ as described above. Finally, the alias server system uses $KEY_{SITE}$ to compute a DES decryption of ALIAS (excluding DOMAIN and PATH). Upon decryption, the alias server system verifies a successful decryption by computing a MD5 hash of the purported ID and RANDOM. This hash value is compared against the purported CHECKSUM and an exact match indicates that the decryption was successful. It will be appreciated that while the values $KEY_{SITE}$, CHECKSUM, and ALIAS have been described above as functions of particular concatenations of variables, the order of concatenation selected for the secret key encryption method is not important so long as the same order is used for both encryption and decryption.

While the encryption and decryption methods described above employ a specific combination of MD5 and DES encryption algorithms, those skilled in the art will understand that there are many possible encryption and decryption methods which would also be suitable and, thus, fall within the scope of the invention. Any one way hash and secret key (symmetric) encryption algorithm could be substituted directly into the structure outlined herein, with appropriate allowances for key lengths and hash output lengths. Similarly, public key (asymmetric) encryption algorithms could also be used with appropriate modification to the disclosed structure.

The encryption method of site-specific alias generation alleviates the necessity of a large database of site-specific aliases since the alias server can simply regenerate the site-specific alias as needed by following the same encryption method. Furthermore, since the alias server system has the secret encryption key, the alias server can decrypt a site-specific alias to determine the identification code of the corresponding user.

After generating the site-specific alias, the alias server system informs the website of the site-specific alias. Typically, the alias server system sends the site-specific alias to the website at the same time the alias server system relays the request for the content at the website. The alias server system may add the site-specific alias to the hypertext transfer protocol (HTTP) header which accompanies each content request. If the selected website is not looking for the site-specific alias, the website will simply ignore it.

As discussed above, the alias server system is configured to generate a unique alias for each website. In addition, because a website may include many web pages, each with its own URL path, the alias server system will also generate a unique alias for each web page. This feature is useful for denying a specific user access to some web pages at a website while allowing access to others. However, many websites may find it difficult to manage and store multiple aliases for each user. Therefore, the alias server system may alternatively be configured to generate, for each user, one alias based on the URL of a single web page at the website, and then re-use this alias for all web pages having the same URL domain.

Because the encryption process can be time-consuming, it may be inefficient to generate a site-specific alias each time a user accesses a website. Thus, the alias server system may maintain a database of websites which previously requested a user identifier or site-specific alias. If the user selects the URL of one of those websites, the alias server system would then generate a site-specific alias and place it in the HTTP header of the content request to the website. Alternatively, the alias server system may only generate a site-specific alias if the website requests one.

Furthermore, Internet cookies may be used to send and receive user aliases. As used herein, an Internet cookie ("cookie") is an amount of data which is associated with a website, and which is stored on a user terminal. When a user accesses a particular website for the first time, the website may return a "set-cookie" instruction along with the content requested by the user. Typically, the set-cookie instruction is contained in the HTTP header preceding the content. The user terminal is configured to receive a set-cookie command and to store the cookie and then return it to the particular website each time the user terminal accesses the website.

Where the user terminal is a WEBTV Internet terminal, the alias server system may include a database (not shown) for storing a plurality of cookies for each user/subscriber, where each cookie is associated with a particular website. Alternatively, as shown in FIG. 2, the set-top box 22 may include a cookie storage database 23 for storing a plurality of cookies. Where the user terminal is a personal computer running an Internet navigating program, the cookies may be stored in the random access memory (RAM) or on the hard drive of the computer so as to be accessible by the Internet navigating program.

In any event, the use of cookies allows a website to request a site-specific alias one time, and then receive that site-specific alias each subsequent time the user terminal accesses the website. The website must be configured to determine whether the user terminal and/or server system accessing the website is capable of providing a site-specific alias in the form of a cookie. Preferably, the website maintains a database listing which types of user terminals and/or server systems are configured to provide site-specific user aliases. Since each HTTP request contains a USER-AGENT header defining the type of user terminal or server system which is making the request, the website simply reads the information in the USER-AGENT header and compares it to the database. If the user terminal or server system supports site-specific user aliases, the website returns a set-cookie instruction within the HTTP header of the content the website sends to the IP address. The alias server system reads the set cookie command and generates a site-specific alias in response. The alias server system then stores the alias cookie in the cookie database of the alias server system. Alternatively, the alias server system inserts the alias cookie into the set-cookie command and relays it to the user terminal along with the requested content. In the latter case, the user terminal stores the alias cookie in database 23 of the set-top box. The alias cookie is subsequently included in the HTTP header of each subsequent request for content by the user terminal to the particular website.

Regardless of when the alias is generated or how it is sent to the website accessed by the user, the alias maintains the user's anonymity since it is impractical to determine the user's identity from the alias. Nevertheless, because a user's alias for a particular website does not change over time, the website is able to recognize a particular user from previous occasions when the user accessed the website. Thus, when a website receives an alias which it recognizes as associated with a disruptive user, the website can deny or block access to the user. Furthermore, since the alias server system can decrypt the alias to determine the user's identity, law enforcement agencies can obtain the user's identity from the operator of the alias server system if necessary. However, if the user is able to modify his or her alias, the user could defeat the ability of websites to block the user's access. Therefore, the alias server system and/or the user terminal is preferably configured to protect the alias from modification by the user.

In the embodiment of system 30 described above, alias server system 42 acts as a proxy server and carries out the alias generation function by reading and modifying the information—typically, the HTTP headers—which pass between the user terminal and the website. However, this mode of operation is not possible when the website and the user terminal are engaged in some types of secure communication.

One of the most common methods of secure communication over the Internet is the Secure Sockets Layer (SSL) protocol. SSL is a secure network protocol which a user terminal and a website agree to follow in communicating. Under the SSL protocol, data transfers are encrypted using a secret encryption key known only to the user terminal and the website. Thus, the alias server system cannot modify the HTTP header because the header has been encrypted and the alias server system does not know the secret encryption key.

Therefore, alternatively, the alias server system does not act as a proxy. Instead, access server system 40 is configured to access websites via its own direct connection(s) 34b without communicating through the alias server system. During SSL communications between the user terminal and the website, the access server system simply relays the encrypted data without modifying it.

To apply the alias generation method to SSL or other communications in which a proxy server is not available, the user terminal must be configured to request and receive an alias from the alias server system. The user tenninal typically sends an alias request to the alias server system before beginning the communication with the website. Along with the request, the user terminal sends the user's identification code and the URL of the address. Upon receipt of the request, the alias server system generates an alias based on the identification code and the website address, and then transmits the alias to the user terminal where it is stored. The user terminal then informs the website of the alias, typically by sending the alias to the website in an HTTP header or a cookie. If the user terminal and the website are communicating using the SSL protocol, the user terminal encrypts the alias before sending it and the website decrypts the result to determine the alias (but not the user's identification code).

As described above, alias server system 42 and access server system 40 may be separate servers resident on separate computers within a computer network access system. However, those skilled in the art will recognize that either or both server systems might comprise a plurality of computers. Furthermore, the functions of both the alias server system and the access server system could be combined into a single server system. Alternatively, alias server system 42 may be separate from system 30 though still connected via Internet 10 or some other communications line. The alias server system may still act as a proxy if it has a connection to the Internet. In any event, a separate alias server system would continue to generate user aliases as described above.

System 30, in conjunction with an alias server system, allows an entity providing Internet access to a plurality of users to protect the anonymity of its subscribers while ensuring that its access facilities are not used for disruptive or illegal purposes. Using system 30, a method for allowing a website to recognize an anonymous user accessing the website through a proxy server, without revealing the identity of the user, is shown generally at 100 in FIG. 8. As indicated at 110, a secret encryption key, $KEY_{SYSTEM}$, is selected for use in the encryption algorithms. Preferably, $KEY_{SYSTEM}$ is selected by the alias server system operator and maintained in strict secrecy. At step 112, an identification code is assigned to at least one user so as to uniquely identify that user. Preferably, the identification code is stored by the alias server system and protected from modification by the user to prevent the user from defeating a website's attempts to block access by the user.

Figure 8:
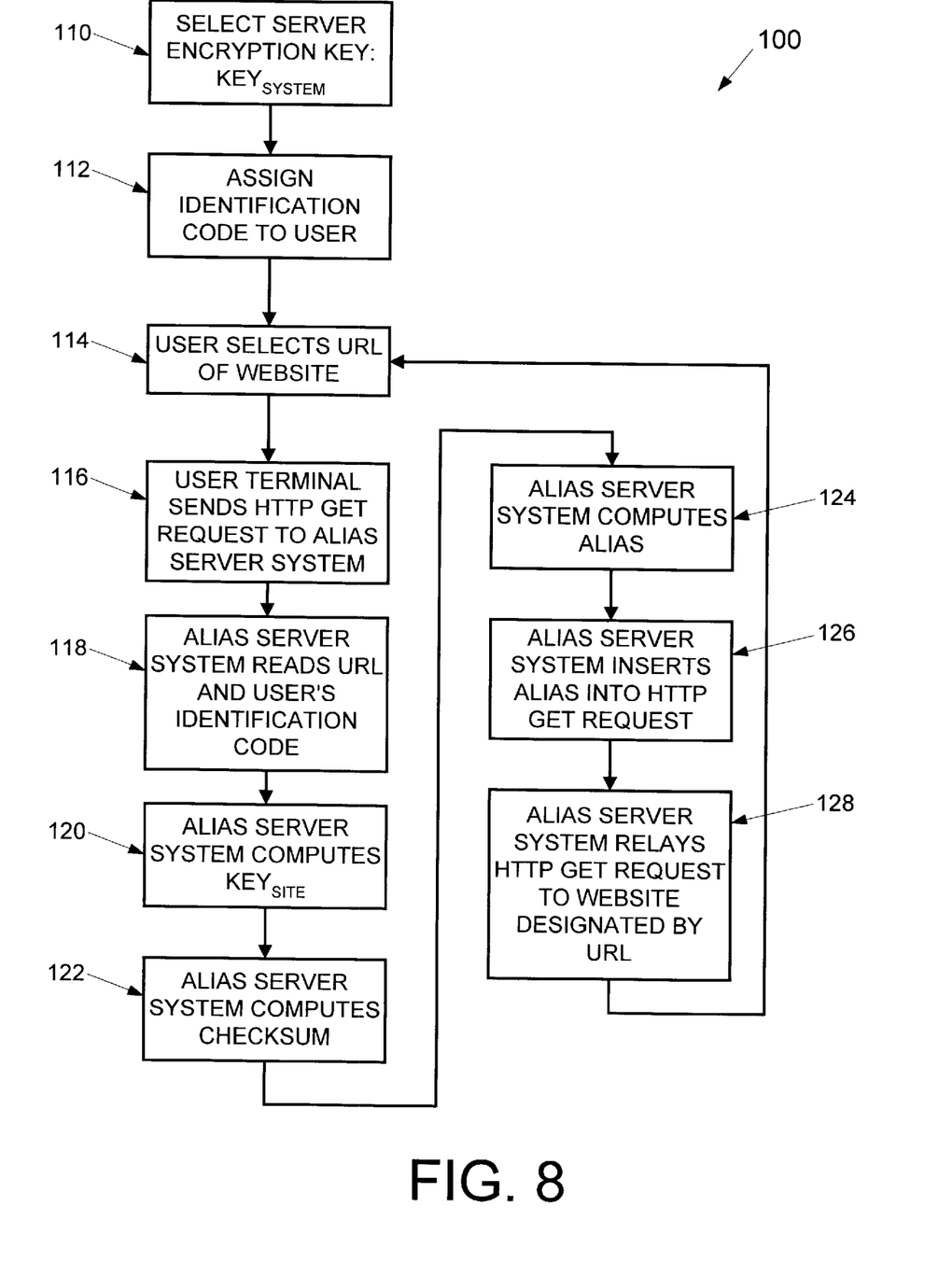
FIG. 8 is a flowchart illustrating a method for allowing a website to recognize an anonymous user accessing the website.

As indicated at 114, the user requests content from a website by operating the user terminal to select the URL which designates that website. To download the content of the selected website, the user terminal generates an HTTP GET request. At step 116, the user terminal sends the HTTP GET request to the alias server system which acts as a proxy server as well as an alias generation server. Subsequently, at step 118, the alias server system begins the alias generation process by reading the URL in the HTTP GET request as well as the user's identification code. The user typically must log-on to the alias server by inputting the identification code. The alias server system then reads the identification code and verifies that it is valid. Alternatively, the alias server system reads the user's identification code from memory, without input from the user.

Once the alias server system has the identification code and the URL, the alias server system can proceed to compute a site-specific alias based on the identification code and the URL. At step 120, the alias server system computes the value $KEY_{SITE}$ by, for example, computing the one-way hash value of the URL combined with $KEY_{SYSTEM}$. As indicated at 122, the alias server system then computes the value CHECKSUM by, for example, computing the one-way hash value of the identification code combined with a random data string associated with the user. At step 124, the alias server system computes ALIAS by, for example, encrypting the identification code combined with CHECKSUM and a random data string using $KEY_{SITE}$ as the encryption key. This method of generating ALIAS ensures that it will be computationally difficult to determine the identification code of the user from ALIAS alone.

As shown at step 126, the alias server system then inserts ALIAS into the HTTP header of the GET request sent by the user terminal. Finally, at step 128, the alias server system relays the modified HTTP GET request to the website designated by the URL selected by the user. The website may then carry out the HTTP GET request or may block the user's access by refusing the request. If the website elects to carry out the request, the website downloads the content to the alias server system which relays it to the user terminal. Once the user has finished viewing the content which was downloaded, the user can repeat the process by selecting the URL of another website, thus, returning to step 114.

Figure 9:
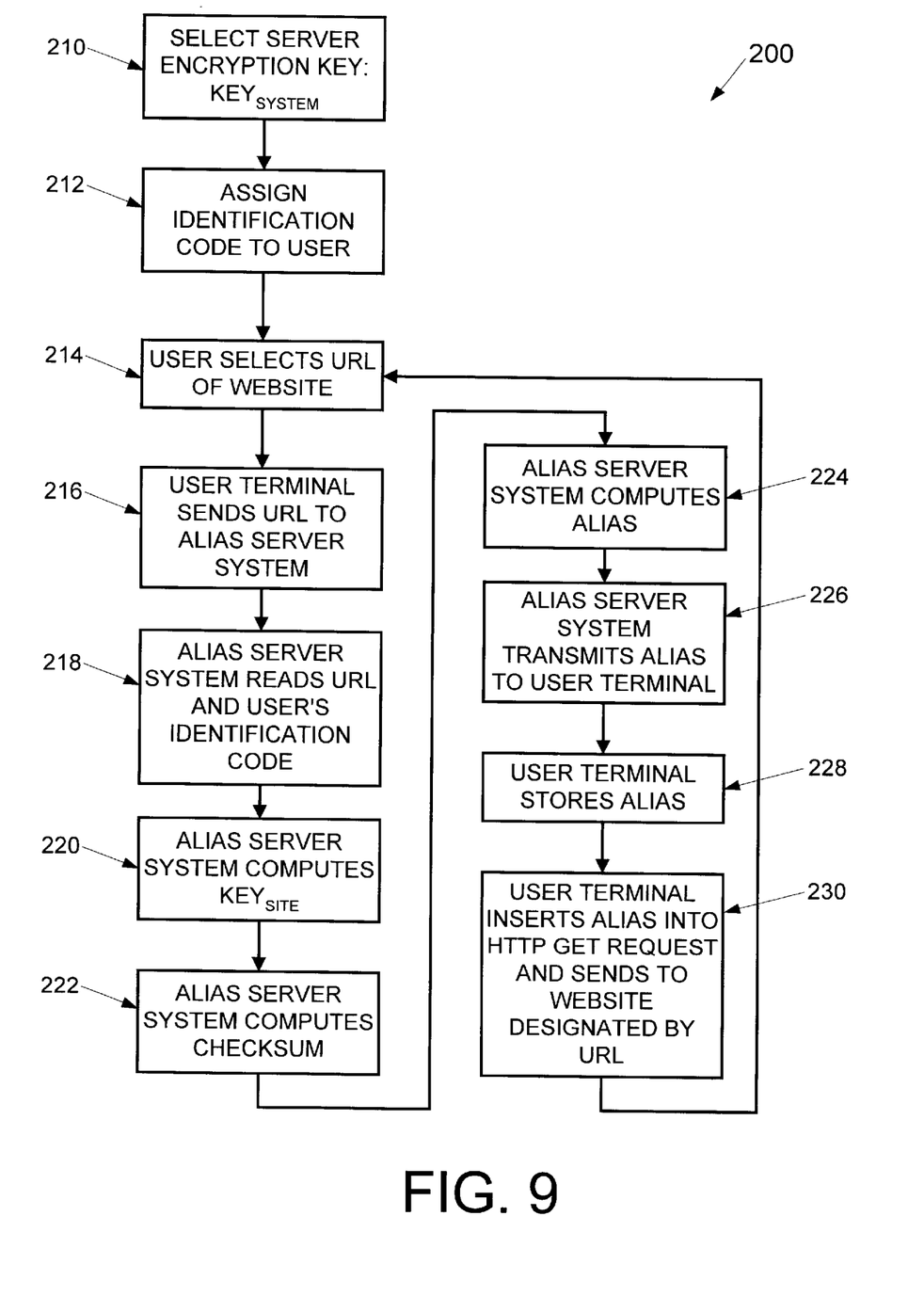
FIG. 9 is a flowchart illustrating an alternative method for allowing a website to recognize an anonymous user accessing the website.

Another method of allowing a website to recognize an anonymous user is shown generally at 200 in FIG. 9. As indicated at 210, a secret encryption key is selected for use by the alias server system. At step 212, an identification code is assigned to a user so as to uniquely identify the user. At step 214, the user selects the URL which designates a particular website. As shown at 216, the user terminal then sends the URL to the alias server system. This allows the alias server system to generate an alias that is specific to the website designated by that URL.

As in the method described above, the alias server system proceeds to read the URL and the user's identification code at 218, compute $KEY_{SITE}$ at 220, compute CHECKSUM at 222, and compute ALIAS at 224. However, instead of sending ALIAS to the website as in the above described method, as indicated at 226, the alias server system transmits ALIAS to the user terminal. At step 228, the user terminal stores ALIAS upon receipt from the alias server system. Subsequently, at step 230, the user terminal inserts ALIAS into an HTTP GET request which the user terminal sends to the website designated by the selected URL. If the user terminal and the website are engaged in secure communications, such as according to SSL protocol, the user terminal encrypts the HTTP GET request before sending it to the website.

In any event, the website may carry out the HTTP GET request or may block access as described above. Furthermore, the user may select another website, thus returning to step 214. Note that in this alternative method, depicted in FIG. 9, it is not necessary that the user terminal access the website via the server system which generates the alias.

As a further alternative method, the site-specific alias is generated using only a one-way hash function such as the MD5 algorithm. This further alternative method is similar to the methods illustrated in FIGS. 8 and 9 except that no encryption keys are needed. Instead, once the alias server system reads the user's identification code and the URL of the selected website, the alias server system generates the alias by, for example, computing the one-way hash value of the URL combined with the user's identification code and a random data string associated with the user. The alias server system then inserts the alias into the HTTP header of the GET request as illustrated in FIG. 8, or transmits the alias to the user terminal as illustrated in FIG. 9.

While the invention has been disclosed in its preferred form, the specific embodiments thereof as disclosed and illustrated herein are not to be considered in a limiting sense as numerous variations are possible. Applicants regard the subject matter of their invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims are also regarded as included within the subject matter of applicants' invention irrespective of whether they are broader, narrower or equal in scope to the original claims.

What is claimed is:

1. A method for providing a site-specific alias to identify a user to a computer network site, the method comprising the steps of:

for each of a plurality of computer network sites accessed by a user having an identity, generating a corresponding, unique alias such that the identity of the user cannot be determined from the alias, and where the user cannot modify the alias; and for at least one of the computer network sites, sending the corresponding alias to the computer network site upon access of the computer network site by the user.

2. The method of claim 1, wherein the step of generating is carried out without input from the user.

3. A method for allowing a computer network site to recognize a user without revealing the identity of the user to the computer network site, the method comprising the steps of:

generating an alias based on the identity of the user and the computer network site such that it is computationally difficult to determine the identity of the user from the alias alone;

protecting the alias from modification by the user; and informing the computer network site of the alias upon access of the computer network site by the user.

4. The method of claim 3, wherein the user has an identification code, and where the step of generating includes encrypting the identification code.

5. The method of claim 3, wherein the computer network site has a network address, and where the step of generating includes encrypting the network address.

6. The method of claim 3, wherein the user has an identification code and the computer network site has a network address, and wherein the step of generating includes encrypting the identification code and the network address using a one-way hash function.

7. The method of claim 6, wherein the step of generating includes computing an MD5 hash value of the network address, the identification code, and a data string, concatenated in that order.

8. The method of claim 7, wherein the user is one of a plurality of users each having a unique identification code and data string combination, and further comprising the step of determining the user's identification code from the alias by computing a one-way hash value of the network address and each combination of identification code and data string until a value matching the alias is found.

9. The method of claim 8, wherein the one-way hash function allows sequential processing of inputs, and wherein the step of determining the user's identification code from the alias includes processing the network address through the one-way hash function to obtain a preliminary value, and then, for each combination of identification code and data string, completing the one-way hash function by processing the identification code and data string through the one-way hash function to obtain a final value from the preliminary value, until a final value matching the alias is obtained.

10. The method of claim 3, wherein the user has an identification code and the computer network site has a network address, and where the step of generating includes encrypting the identification code and the network address with at least one is secret encryption key.

11. The method of claim 10, wherein the step of generating includes computing a one-way hash value of the secret encryption key and the network address to form a site key, and encrypting the identification code with the site key.

12. The method of claim 10, wherein the step of generating includes computing a one-way hash value of the identification code with a data string, and encrypting the identification code, the data string and the one-way hash value to form the alias.

13. The method of claim 12, wherein the alias can be decrypted to determine the identification code, the data string and the one-way hash value, and where the decryption can be verified by computing the one-way hash value of the decrypted identification code and the decrypted data string, and comparing the computed hash value with the decrypted hash value.

14. The method of claim 10, wherein the alias can be decrypted to determine the identification code using the at least one secret encryption key.

15. The method of claim 3, wherein the step of informing is carried out each time the user accesses a computer network site.

16. The method of claim 3, wherein the step of informing is carried out if requested by the computer network site accessed by the user.

17. The method of claim 3, wherein the step of informing is carried out if the user accesses a computer network site which previously requested the alias.

18. The method of claim 3, wherein the step of informing includes sending the alias to the computer network site in an HTTP header.

19. The method of claim 3, wherein the step of informing includes sending the alias to the computer network site in the form of a cookie.

20. The method of claim 3, wherein the step of informing is carried out using a secure network protocol.

21. A method for providing a site-specific user alias to an Internet site accessed by a user, the method comprising the steps of:
    assigning an identification code to a user;
    providing an alias server system connected to the Internet;
    generating an alias by the server system, where the alias is based on the identification code and the Internet site selected by the user such that it is computationally difficult to determine the identification code from the alias alone; and
    sending the alias to the Internet site upon access of the Internet site by the user.

22. The method of claim 21, wherein the step of generating is carried out without input from the user.

23. A method for allowing a computer network site to recognize a user without revealing the identity of the user to the computer network site, the method comprising the steps of:
    providing an identification code to a user utilizing a user terminal to access a computer network site;
    generating an alias based on the identification code and the computer network site such that it is impractical to determine the identification code from the alias alone;
    storing the alias on the user terminal; and
    configuring the user terminal to inform the computer network site of the alias.

24. The method of claim 23, wherein the step of generating is carried out without input from the user.

25. The method of claim 23, wherein the step of generating includes encrypting the identification code.

26. The method of claim 23, wherein the computer network site has a network address, and wherein the step of generating includes encrypting the identification code and the network address using a one-way hash function.

27. The method of claim 26, wherein the step of generating includes computing an MD5 hash value of the network address, the identification code, and a data string, concatenated in that order.

28. The method of claim 27, wherein the user is one of a plurality of users each having a unique identification code and data string combination, and further comprising the step of determining the user's identification code from the alias by computing a one-way hash value of the network address and each combination of identification code and data string until a value matching the alias is found.

29. The method of claim 28, wherein the one-way hash function allows sequential processing of inputs, and wherein the step of determining the user's identification code from the alias includes
    processing the network address through the one-way hash function to obtain a preliminary value,
    and then, for each combination of identification code and data string, completing the one-way hash function by processing the identification code and data string through the one-way hash function to obtain a final value from the preliminary value, until a final value matching the alias is obtained.

30. The method of claim 25, wherein the computer network site has a computer network address, and where the step of generating includes encrypting the identification code and the computer network address with at least one secret encryption key.

31. The method of claim 30, wherein the alias can be decrypted to determine the identification code using the at least one secret encryption key.

32. The method of claim 23, wherein the step of configuring includes configuring the user terminal to send the alias to the computer network site in an HTTP header.

33. The method of claim 23, wherein the step of storing includes storing the alias on the user terminal in the form of a cookie.

34. The method of claim 33, wherein the step of configuring includes configuring the user terminal to send the alias to the computer network site in the form of a cookie.

35. The method of claim 33, wherein the step of storing includes protecting the alias from modification by the user.

36. The method of claim 33, wherein the user terminal is configured to receive a set-cookie command from the computer network site, and where the step of storing is carried out if the user terminal receives a set-cookie command from the computer network site.

37. The method of claim 23, wherein the step of configuring includes configuring the user terminal to inform the computer network site using a secure network protocol.

38. A method for blocking access to an Internet site by an anonymous user, where the user has an identification code and a site-specific alias based on the identification code and the Internet site such that it is computationally difficult to determine the identification code from the alias alone, and where the user cannot modify the alias, the method comprising the steps of:
    receiving the alias if the user accesses the Internet site; and
    denying the user access to the Internet site.

39. A system for allowing a computer network site to recognize an anonymous user, the system comprising:
    a user terminal configured to access a computer network site, where the user terminal is operated by a user having an identification code that cannot be modified by the user; and
    an alias server system connected to communicate with the user terminal and with a computer network site accessed by the user terminal, where the alias server system is configured to generate an alias based on the identification code and the computer network site such that it is excessively difficult to determine the identity of the user from the alias alone.

40. The system of claim 39, wherein the alias server system is configured to inform the computer network site of the alias if the user accesses the computer network site.

41. The system of claim 40, wherein the alias server system is configured to send the alias to the computer network site in an HTTP header.

42. The system of claim 40, wherein the alias server system is configured to send the alias to the computer network site in the form of a cookie.

43. The system of claim 39, wherein the user has an identification code and the computer network site has a network address, and wherein the alias server system is configured to encrypt the identification code and the network address using a one-way hash function.

44. The system of claim 43, wherein the alias server system is configured to compute an MD5 hash value of the network address, the identification code, and a data string, concatenated in that order.

45. The system of claim 44, wherein the user is one of a plurality of users each having a unique identification code and data string combination, and wherein the alias server system is configured to determine the user's identification code from the alias by computing a one-way hash value of the network address and each combination of identification code and data string until a value matching the alias is found.

46. The system of claim 45, wherein the one-way hash function allows sequential processing of inputs, and wherein the alias server system is configured to compute a preliminary value by processing the network address through the one-way hash function, and then for each combination of identification code and data string, compute a final value from the preliminary value by processing the identification code and data string through the one-way hash function until a final value matching the alias is obtained.

47. The system of claim 39, wherein the user has an identification code and the computer network site has a network address, and where the alias server system is configured to encrypt the identification code and the network address with at least one secret encryption key.

48. The system of claim 47, wherein the alias server system is configured to decrypt the alias using the at least one secret key to determine the identification code.

49. The system of claim 39, wherein the alias server system generates the alias without input from the user.

50. A system for allowing a computer network site to recognize an anonymous user, the system comprising:

an alias server system connected to communicate with a user terminal, and configured to generate an alias based on the identity of a user and a computer network site accessed by the user, where it is computationally intractable to determine the identity of the user from the alias alone, and where the alias server system is configured to transmit the alias to the user terminal after the alias is generated; and a user terminal for operation by a user, where the user has an identity, and where the user terminal is connected to access a computer network site, and where the user terminal is configured to receive an alias from the alias server system and to send the alias to the computer network site upon access of the computer network site by the user.

51. The system of claim 50, wherein the user has an identification code and the computer network site has a network address, and where the alias server system is configured to encrypt the identification code and the network address using a one-way hash function.

52. The system of claim 50, wherein the user has an identification code and the computer network site has a network address, and where the alias server system is configured to encrypt the identification code and the network address with at least one secret encryption key.

53. The system of claim 50, wherein the user terminal is configured to send the alias to the computer network site in an HTTP header.

54. The system of claim 50, wherein the user terminal is configured to store the alias in the form of a cookie and to send the alias to the computer network site in the form of a cookie.

55. The system of claim 50, wherein the user terminal is configured to send the alias to the computer network site using a secure network protocol.

56. An alias server system, the system comprising:

a computer server configured to receive a request for a user alias, and configured to generate a user alias based on an identification code and a computer network site such that it is impractical to determine the identification code from the alias alone, and where the computer server is configured to transmit the alias to a user terminal.

57. The system of claim 56, wherein the computer network site has a network address, and where the alias server system is configured to encrypt the identification code and the network address using a one-way hash function.

58. The system of claim 56, wherein the computer network site has a network address and the computer server is configured to encrypt the identification code and the network address using at least one secret encryption key.

59. A user terminal for identifying an anonymous user to a computer network site, comprising:

a user terminal for operation by a user having an identity, where the user terminal is connected to access a computer network site, and where the user terminal is configured to request and receive an alias based on the identity of the user and the computer network site, and where it is computationally difficult to determine the identity of the user from the alias alone.

60. The user terminal of claim 59, wherein the user terminal is configured to send the alias to the computer network site upon access of the computer network site by the user.

61. The user terminal of claim 60, wherein the user terminal is configured to send the alias to the computer network site using a secure network protocol.

* * * * *

UNITED STATES PATENT AND TRADEMARK OFFICE
CERTIFICATE OF CORRECTION

PATENT NO. : 6,463,533 B1  Page 1 of 1
DATED : October 8, 2002
INVENTOR(S) : Pablo M. Calamera, Jay D. Logue and Joseph D. Ternasky

It is certified that error appears in the above-identified patent and that said Letters Patent is hereby corrected as shown below:

Column 1,
Line 65, after "network" replace "," with -- . --

Column 11,
Line 49, after "user" replace "tenninal" with -- terminal --

Signed and Sealed this

Fourth Day of March, 2003

JAMES E. ROGAN
*Director of the United States Patent and Trademark Office*